United States Patent [19]

Medford et al.

[11] Patent Number: 4,462,649
[45] Date of Patent: Jul. 31, 1984

[54] HOSE CONSTRUCTION AND METHOD OF MAKING SAME

[75] Inventors: Richard D. Medford; Jerry W. Cooper, both of Waynesville, N.C.

[73] Assignee: Dayco Corporation, Dayton, Ohio

[21] Appl. No.: 419,861

[22] Filed: Sep. 20, 1982

Related U.S. Application Data

[62] Division of Ser. No. 146,556, May 5, 1980, Pat. No. 4,415,389.

[51] Int. Cl.³ .................................................. H01R 4/64
[52] U.S. Cl. .................................... 339/16 R; 174/47
[58] Field of Search ............... 339/15, 16; 156/91; 174/47

[56] References Cited

U.S. PATENT DOCUMENTS

| 3,387,319 | 6/1968 | Ferraris | 339/16 R |
| 4,018,493 | 4/1977 | Lyman et al. | 339/15 |
| 4,162,370 | 7/1979 | Dunn et al. | 339/15 X |
| 4,277,640 | 7/1981 | Kutnyak et al. | 339/15 X |

*Primary Examiner*—Eugene F. Desmond
*Attorney, Agent, or Firm*—Joseph V. Tassone

[57] ABSTRACT

A hose construction and method of making same are provided wherein such hose construction comprises a flexible corrugated hose made of polymeric material, a pair of hose connectors fixed to opposite ends of the hose, and a sleeve disposed around the hose and having opposite end portions wherein the sleeve is fastened to the hose only at its opposite end portions and the sleeve serves to improve the fluid pressure resistance and external wear resistance of the hose while keeping its flexibility substantially intact.

13 Claims, 11 Drawing Figures

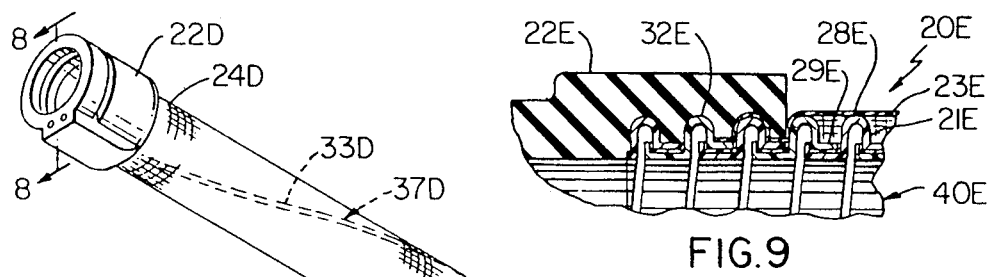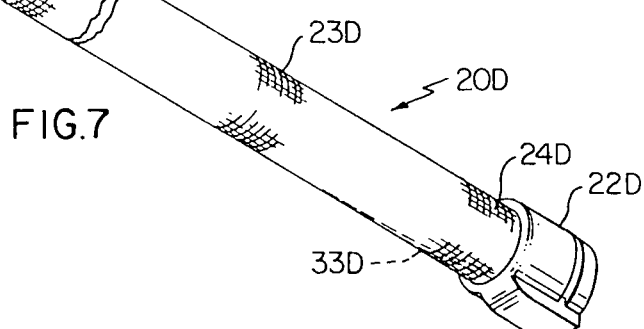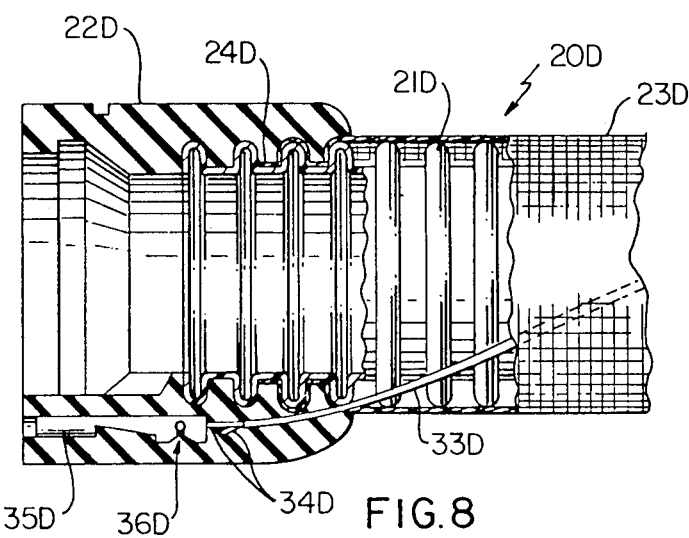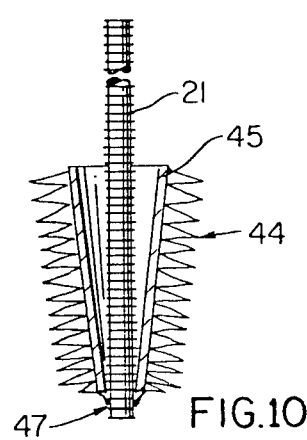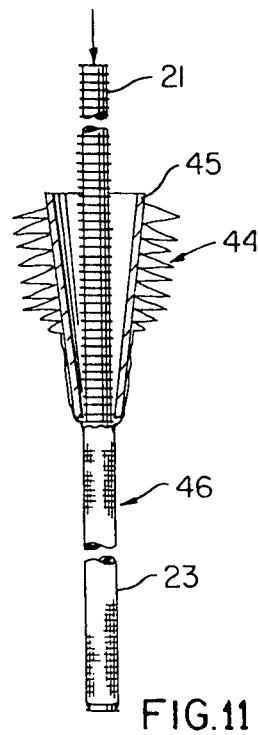

HOSE CONSTRUCTION AND METHOD OF MAKING SAME

CROSS REFERENCE TO RELATED APPLICATION

This application is a divisional patent application of its copending parent patent application, Ser. No. 146,556 filed May 5, 1980 now U.S. Pat. No. 4,415,389.

BACKGROUND OF THE INVENTION

1. Field of the Invention

This invention relates to polymeric hose constructions and in particular to such hose constructions comprised of a flexible corrugated hose which is covered with an outer reinforcing and protective sleeve in the form of a stockinet.

2. Prior Art Statement

It is known in the art to make a polymeric hose with corrugations throughout its length in an effort to provide such hose with high flexibility. However, the performance characteristics of such a corrugated hose are not optimum. It is also known to provide a corrugated hose with a fabric outer sleeve or stockinet of the type disclosed in U.S. Pat. No. 3,185,182 in an effort to increase the fluid pressure resistance and external wear resistance of such hose.

However, the stockinet disclosed in this patent is fastened to the inner corrugated hose substantially along the entire length of the stockinet and hose whereby the cost of the resulting hose construction is unnecessarily increased.

It is also known in the art to provide a vacuum cleaner hose assembly comprised of a substantially corrugated flexible vacuum hose and electrical wires extending along the hose and as disclosed in the U.S. Pat. No. 3,733,697. However, the type of vacuum cleaner hose assembly disclosed in this patent is comparatively expensive.

SUMMARY

It is a feature of this invention to provide a hose construction which is of high flexibility yet is of simple and economical construction.

Another feature of this invention is to provide a hose construction of the character mentioned for a canister type vacuum cleaner which is, in essence, an electric current carrying type vacuum hose construction and has electrical conductor means extending along a corrugated hose whereby the hose construction may be used to provide electrical power to an electrically driven cleaning tool at a location remote from the canister of the vacuum cleaner.

Another feature of this invention is to provide a hose construction of the character mentioned comprised of a flexible corrugated hose made of a polymeric material with a pair of hose connectors fixed to opposite ends of the hose and a comparatively inexpensive sleeve disposed around the hose and having opposite end portions and wherein the hose construction is of minimum cost due to the fact that its inexpensive sleeve is fastened to the hose only at the opposite end portions of the sleeve yet such sleeve serves to improve the fluid pressure resistance and external wear resistance of the corrugated hose while keeping its flexibility substantially intact.

Another feature of this invention is to provide a hose construction of the charater mentioned in which the sleeve is a fabric sleeve.

Another feature of this invention is to provide a hose construction of the character mentioned in which the fabric sleeve is in the form of a stockinet.

Another feature of this invention is to provide a hose construction of the character mentioned in which the sleeve is a polymeric sleeve which is essentially in line contact with the outwardly convex portions of the corrugations of the corrugated hose at locations between the opposite end portions.

Another feature of this invention is to provide a hose construction of the character mentioned in which the opposite end portions of the sleeve are sandwiched between the hose connectors and the hose.

Another feature of this invention is to provide a hose construction of the character mentioned in which the connectors are molded connectors and the opposite end portions of the sleeve are bonded against the molded connectors during the molding action.

Another feature of this invention is to provide a hose construction of the character mentioned in which the hose has thread-like corrugations which extend in a helical path and the hose connectors have internal threads which correspond to and are adapted to be threadedly received over said threadlike corrugations and the opposite end portions of the sleeve are sandwiched between the internal threads and the threadlike corrugations on the hose.

Another feature of this invention is to provide a hose construction of the character mentioned adapted to be used as a vacuum hose which is free of reinforcing wires and which has simple electrical conductor means extending between the hose and the sleeve with the hose connectors having associated electrical connectors supported therein in an embedded manner and each of the electrical connectors receiving an associated end of the electrical conductor means.

Another feature of this invention is to provide a hose construction of the character mentioned in which the sleeve is made of a fire-resistant fabric material.

Another feature of this invention is to provide a method of making a hose construction of the character mentioned.

Therefore, it is an object of this invention to provide an improved hose construction and method of making same having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which

FIG. 7 is a perspective view similar to FIG. 1 illustrating another exemplary embodiment of the hose construction of this invention in the form of an electric current carrying hose construction;

FIG. 8 is an enlarged fragmentary view with parts in cross section and parts in elevation taken essentially on the line 8—8 of FIG. 7;

FIG. 9 is a fragmentary view with parts in cross section and parts in elevation illustrating another exemplary embodiment of the hose construction of this invention;

FIG. 10 is a primarily schematic presentation particularly illustrating an initial step employing a tubular fixture which may be used to install a sleeve in the form of a stockinet around an associated corrugated hose; and FIG. 11 is a view similar to FIG. 10 illustrating the stockinet of FIG. 9 installed over a length of the corrugated hose by relatively moving the tubular fixture and hose.

DETAILED DESCRIPTION

Figure 1:
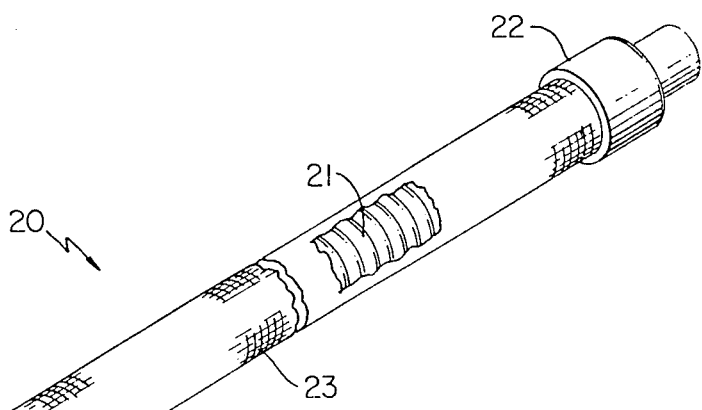
FIG. 1 is a perspective view with parts broken away illustrating one exemplary embodiment of the hose construction of this invention.
Figure 2:
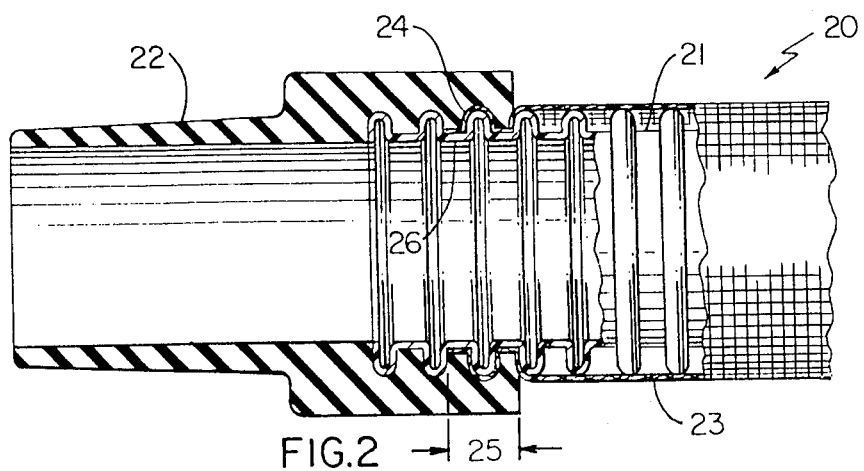
FIG. 2 is an enlarged fragmentary view with parts in cross section and parts in elevation taken essentially on the line 2—2 of FIG. 1.

Reference is now made to FIG. 1 of the drawings which illustrates one exemplary embodiment of the hose construction of this invention and such a construction is designated generally by the reference numeral 20. The hose construction 20 comprises a flexible corrugated hose 21 made of polymeric material; a pair of hose connectors, each designated by the same reference numeral 22, fixed to opposite ends of the hose 21; and a sleeve 23, to be described in detail subsequently, disposed around the hose 21. The sleeve 23 has opposite end portions, each designated by the same reference numeral 24, and as best shown in FIG. 2. The sleeve 23 is preferably a fabric sleeve in the form of a stockinet and such sleeve 23 is fastened to the hose 21 only at its opposite end portions 24. The sleeve serves to improve the fluid pressure resistance and external wear resistance of the hose 21 and hence the hose construction 20 while keeping the flexibility of the hose 21 substantially intact.

The fabric sleeve 23 has each of its end portions 24 extending along a substantial axial length 25 of an associated hose connector 22. The hose connectors 22 are formed in position concentrically around the hose 21 and the end portions 24 of sleeve 23 by molding same in position and as is known in the art. The molding action may be achieved by supporting the opposed end portions or ends 26 of the hose 21 with the outer end portions 24 of the sleeve 23 in an associated mold device (not shown) and as is known in the art, whereupon both hose connectors 22 are simutaneously formed in such mold device while providing a simultaneous bonding or fixing of the ends 26 of the corrugated hose 21 to the hose connectors 22 with the end portions 24 of the sleeve 23 also simultaneously fastened in position in a sandwiched manner.

Figure 4:
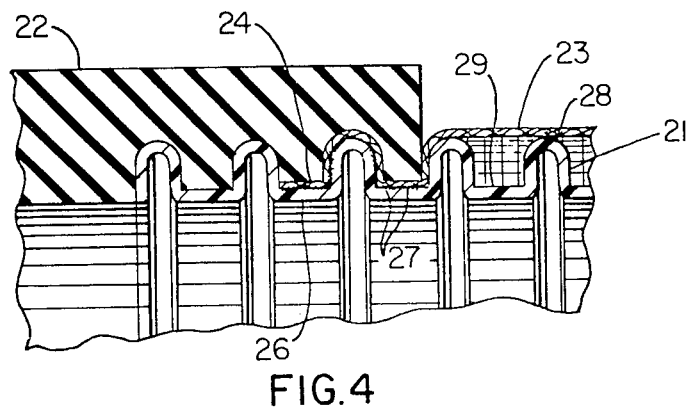
FIG. 4 is a greatly enlarged cross-sectional view particularly highlighting the manner in which a typical hose connector at one end of the hose construction of FIG. 1 may be molded in position against its associated hose and sleeve.

The end portions 24 of the sleeve 23 are also fastened in position to their associated ends 26 of the corrugated hose 21 employing adhesive means or an adhesive indicated by randomly disposed dots 27 in FIG. 4 of the drawing. The use of adhesive 27 enables the hose connectors 22 to be molded in position with optimum efficiency and with minimum likelihood of relative movement between the fabric sleeve 23 and the corrugated hose 21 during handling thereof in preparation for the molding of the hose connectors 22. In this manner it will be seen that the opposite end portions 24 of the sleeve 23 are fastened to their hose 21 by the dual action of adhesive 27 and the adhesive action produced by molding the hose connectors 22 in position.

The hose 21 is of optimum simplicity and in this embodiment such hose is a so-called blow-molded hose, i.e., the hose 21 is made by the well known blow-molding process. Accordingly, the hose 21 utilizes a minimum amount of material and hence is basically of minimum cost yet as is typical of blow-molded corrugated hose it has high flexibility. The blow-molded hose 21 has a substantially uniform thickness throughout and has annular corrugations or convolutions defined by alternating outwardly convex projections 28 and outwardly concave recesses 29, FIG. 4.

Other exemplary embodiments of hose construction of this invention are illustrated in FIGS. 3, 5, 6, 7–8, and 9 of the drawings. The hose constructions illustrated in FIGS. 3, 5, 6, 7–8, and 9 are very similar to the hose construction 20; therefore, such hose constructions will be designated by the reference numerals 20A, 20B, 20C, 20D, and 20E respectively and representative parts of each hose construction which are basically similar to corresponding parts of the hose construction 20 will be designated in the drawings by the same reference numerals as in the hose construction 20, whether or not such representative parts are mentioned in the specification, followed by the associated letter designation, either A, B, C, D, or E and not described again in detail. Only those parts of each hose construction which are substantially different from corresponding parts of the hose construction 20 will be designated by a new reference numeral also followed by an associated letter designation and described in detail.

Figure 3:
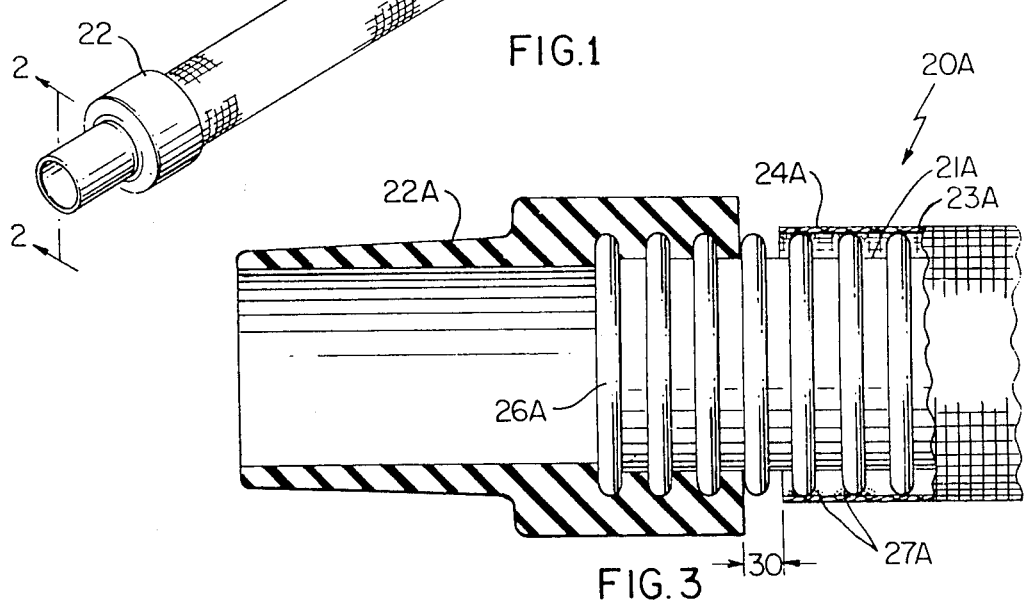
FIG. 3 is a view similar to FIG. 2 illustrating another exemplary embodiment of the hose construction of FIG. 1.

The hose construction 20A of FIG. 3 is comprised of a flexible corrugated hose 21A made of polymeric material, a pair of hose connectors 22A fixed to opposite ends of the hose, and a sleeve in form of a stockinet 23A provided with only its opposite end portions 24A fastened to the hose 21A. However, instead of utilizing the hose connectors 22A to help hold the end portions 24A of the stockinet 23A in position against the hose 21A the opposite end portions 24A are fastened to the hose 21A in spaced relation, indicated by a distance 30, from an associated hose connector 22A utilizing adhesive means in the form of adhesive 27A.

Figure 5:
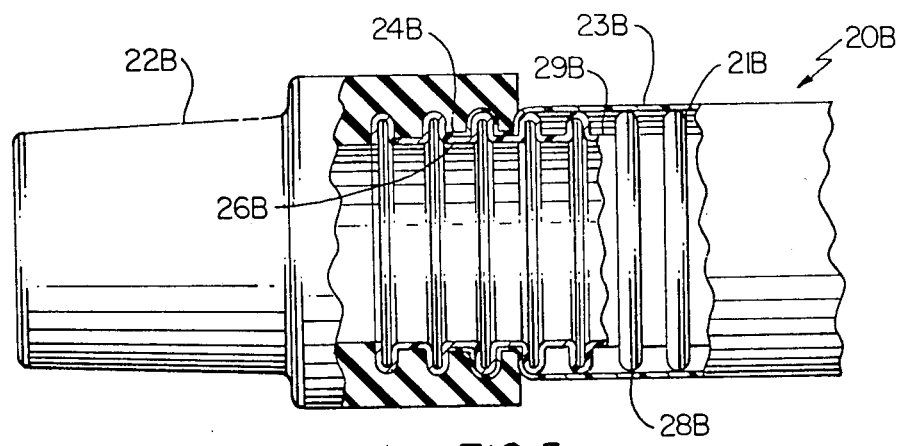
FIG. 5 is a view similar to FIG. 2 illustrating another exemplary embodiment of the hose construction of this invention.

The hose construction 20B of FIG. 5 comprises a flexible corrugated hose 21B made of polymeric material and hose connectors 22B; however, instead of having a stockinet for its outer sleeve the hose construction 20B has a comparatively thin polymeric sleeve 23B. The polymeric sleeve has only its opposite end portions 24B fastened to the hose 21B and the fastening action in this example is achieved by molding each hose connector 22B around an associated end portion 24B of the polymeric sleeve 23B and an associated end 26B of the corrugated hose 21B.

The polymeric sleeve 23B is unattached or basically free from the hose 21B at locations between the end portions 24B. Instead, the sleeve 23B merely contacts the outwardly convex projections 28B providing a circular line contact between each annular projection 28B and the sleeve. In addition, the sleeve 23B is basically taut and free of sags between projections 28B and over the recesses 29B.

Figure 6:
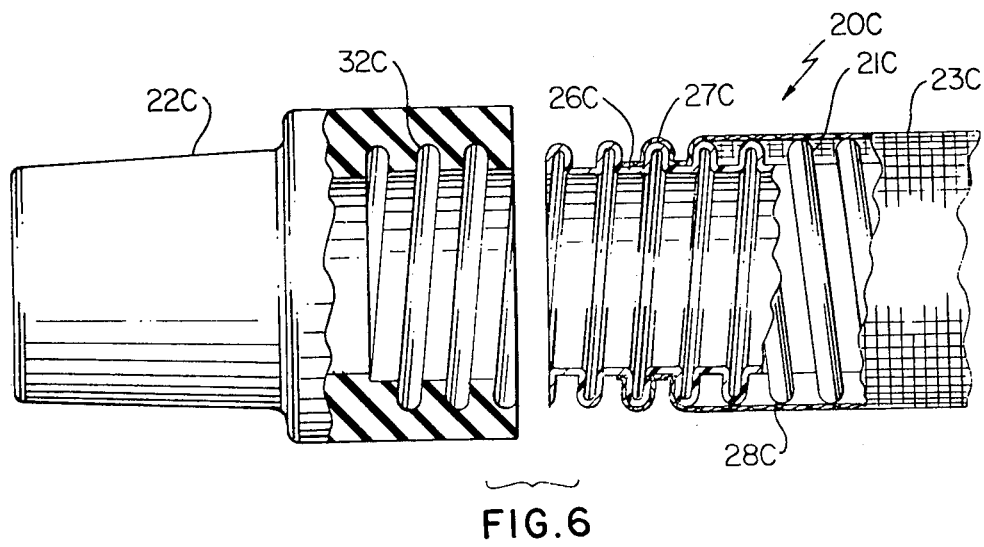
FIG. 6 is a fragmentary view with parts in elevation, parts in cross section, and a hose connector exploded away illustrating another exemplary embodiment of the hose construction of this invention.

The hose construction 20C of FIG. 6 has a flexible corrugated hose 21C made of polymeric material, hose connectors 22C, and stockinet 23C which is fixed to an associated end of the hose 26C by adhesive means in the form of adhesive 27C. However, instead of annular corrugations or projections it will be seen that the hose 21C has thread-like corrugations or projections 28C which extend in a helical path. In addition, each hose connector 22C has internal threads 32C which correspond to and are adapted to be threadedly received over the thread-like projections 28C.

In the illustration of FIG. 6 the hose connector 22C at one end of the hose construction 20C is shown exploded away or in space relation from the remainder of such hose construction and this has been done for ease of presentation. However, in the completed construction each hose connector 22C is threaded over the thread-like projections 28C at its end of the hose 21C thereby sandwiching an associated end portion 24C between the hose connector 22C and hose 21C. This threading action assures that each hose connector 22C cooperates with the adhesive 27C to hold the stockinet 23C in position on the hose 21C. As described before the stockinet 23C is only held in position, so that it can perform its strengthening and protective function, by fastening only the opposite end portions 24C thereof to the hose 21C.

The hose construction 20D of FIGS. 7 and 8 is particularly adapted to be used as a vacuum cleaner hose construction or assembly of the type utilized on a canister type vacuum cleaner which utilizes an electric power driven cleaning tool at the remote end of the hose construction and for this purpose the hose construction 20D has electrical conductor means 33D in the form of a plurality of two electrically insulated electrical conductors each designated by the same reference numeral 34D. The electrical conductor means is in the form of an electrical conductor assembly or cord 34D which extends along the hose construction 20D and is disposed between the outside surface of the hose 21D and the stockinet 23D.

As in the previously described hose constructions, the stockinet 23D has only its opposite end portions 24D fastened to the hose and this fastening action is achieved solely by molding the associated hose connector 22D therearound as illustrated in FIG. 8. Each hose connector 22D has a pair of electrical connectors 35D supported therein in an embedded manner and each of the electrical connectors 35D receives an associated end of an electrical conductor 34D, as shown at 36D, and provides a high strength mechanical and electrical connection.

The electrical connectors 35D in each hose connector 22D of this example are female connectors and are embedded in each hose connector 22D simultaneously while having an associated electrical connector 34D connected thereto and during the process of forming their hose connector 22D by molding action. During this molding the associated end portion 24D of the stockinet is molded and fixed in position in a similar manner as previously described. The assembly or cord 33D and hence the electrical conductors 34D thereof are wrapped concentrically and helically around at least a portion of the outside surface of the corrugated hose in one or more turns as illustrated at 37D in FIG. 7, before the stockinet 23D is disposed outwardly thereof. This wrapping of the cord 33D assures that the flexibility of the overall hose construction 20D is not impaired.

The hose construction 20E of FIG. 9 is comprised of flexible corrugated hose 21E made of polymeric material, hose connectors 22E, and stockinet 23E. The hose 21E has thread-like corrugations which extend in a helical path along the flexible hose and such hose is a so-called strip formed hose inasmuch as the hose is defined by helically wound strip which is designated by the reference numeral 40E. The helically wound strip has integral convolutions or corrugations provided as an integral part thereof which define the projections 28E and recesses 29E. The hose construction 20E is provided with a stockinet 23E and its hose connectors 22C may have internal threads 32E and may be threadedly fastened in position in a similar manner as previously described for the hose connectors 22C of the hose construction 20C. Each hose connector 22E may also be molded in position so as to thereby fasten the hose connector 22E in position against the hose 21E while sandwiching the associated end portion 24E of the stockinet 23E in position therebetween.

Each hose construction 20 and 20A through 20E may be made using method steps which comprise forming a flexible corrugated hose of polymeric material, fixing a pair of hose connectors at opposite ends of the hose, disposing a sleeve which has opposite end portions around the hose, and fastening the sleeve to the hose only at its opposite end portions with that part of the sleeve that is disposed between such end portions being free and unattached whereby such sleeve serves to improve the fluid pressure resistance and external wear resistance of the hose while keeping the flexibility of the hose substantially intact.

The fastening of the strengthening and protective sleeve in position may comprise sandwiching each opposite end portion of the sleeve between the hose and its hose connector as shown for hose constructions 20 and 20B through 20E. In addition, the steps of fixing each hose connector in position and sandwiching of each sleeve end portion between the hose and its hose connector may be achieved in a simultaneous manner by molding the hose connector concentrically around an associated end portion of the sleeve and hose. However, the fixing of each hose connector in position may comprise threadedly fastening each hose connector in position as described in connection with the hose construction of FIG. 6, for example. In this instance it may be preferred to temporarily fasten each end portion 24C of the stockinette to the hose 21C preferably by temporarily adhesively fastening same in position with adhesive 27C.

Each sleeve provided on each hose construction 20 and 20A-20E may be installed in position utilizing any suitable installation technique known in the art. However, because the preferred sleeve is a stockinette which is basically stretchable, one technique which may be employed is to axially compress the sleeve into a plurality of axial folds as illustrated schematically at 44 in FIGS. 10 and 11 while radially expanding such sleeve over a tubular fixture 45. In this example the tubular fixture is a substantially frustoconical fixture 45 and an end of the convoluted or corrugated hose 21 is then inserted through the fixture 45 whereupon an end of the compressed stockinette 23 is temporarily attached to the corrugated hose 21 as illustrated at 47 in FIG. 10. The hose with the stockinette attached and the fixture 45 are then relatively moved to cover the corrugated hose essentially as illustrated at 46 in FIG. 11; and, during this covering action the stockinette 23 self-contracts substantially to its original configuration.

This procedure is facilitated with a stockinette made of fabric material; however, a similar procedure with or without a special tubular fixture may be utilized in the case of the sleeve 23B made of synthetic plastic material.

Each hose 21 and 21A–21E comprising the hose construction of this invention may be made using any suitable polymeric material known in the art and preferably a synthetic plastic material. In addition each hose is preferably made by blow molding or by helically winding a polymeric strip or ribbon and as described earlier. However, regardless of the technique that is employed in forming the corrugated hose, the main concern is to provide such hose as economically as possible and generally by utilizing a minimum amount of material.

Similarly, each hose connector 22 and 22A–22D is preferably made of a suitable polymeric material and by a suitable molding process.

Each outer sleeve 23 and 23A–23E is also preferably made as inexpensively as possible. The preferred outer sleeve may also be braided in position with a conventional braiding machine during the process of making the inner hose.

Nevertheless, the key consideration in the forming of the hose construction of this invention is to provide an inner corrugated hose which is as inexpensive as possible together with an outer sleeve which is also as inexpensive as possible. In addition, and to help maintain the cost of the hose construction at a minimum the outer sleeve, whether in the form of a stockinette or a thin polymeric sleeve or sheath, has only its opposite end portions attached adjacent the hose connectors. This keeping of the cost of the hose construction at a minimum is aided because by attaching the outer sleeve only at its end portions less adhesive material, processing time, and equipment maintenance is required.

The stockinette may also be made of materials having special properties which are correlated with the eventual use of the hose construction. For example, in one application of this invention where the hose construction is used in the vicinity of hot sparks from a welding or cutting torch, the stockinet may be made of a fire-resistant material such as fire-resistant woven material. Woven material made of woven glass fibers popularly referred to as fiberglass may be used for this purpose.

As mentioned earlier, the outer sleeve may be made entirely of polymeric material and in this instance such outer sleeve has a wall thickness which is substantially less than the wall thickness of the corrugated inner hose. In FIG. 5 of the drawings the sleeve 23B is shown with a thickness about equal to the thickness of the outer sleeve 23B and this has been done for ease of drawing presentation. However, in actual practice, the sleeve 23B has a thickness which is a small fractional part (less than one third) of the thickness of the hose 21B.

Each outer sleeve 23 and 23A–23E provides protection for its associated inner hose by isolating same therewithin. Further, even though the outer sleeve is of comparatively small wall thickness it increases the fluid pressure resistance of its overall hose construction and this is achieved because the sleeve reinforces the inner hose radially and also prevents axial expansion of the inner hose which further increases its radial strength.

While present exemplary embodiments of this invention and methods of practicing the same, have been illustrated and described, it will be recognized that this invention may be otherwise variously embodied and practiced within the scope of the following claims.

What is claimed is:

1. In a hose construction comprising a flexible corrugated hose made of polymeric material and having a plurality of outwardly convex projections with recesses therebetween and extending from one end thereof to the other end thereof, a pair of hose connectors fixed to opposite ends of said hose, and a sleeve disposed around said hose and having opposite end portions, the improvement in which said sleeve is fastened to said hose only at its opposite end portions by having each opposite end portion sandwiched between said hose and its respective hose connector so that each hose connector holds its respective end portion of said sleeve in sandwiched relation against at least one projection of said hose and against at least one recess of said hose that is adjacent to said one projection, said hose connectors being molded connectors and said opposite end portions of said sleeve being bonded against said molded connectors, said sleeve making only substantially circular line contact with said projections between said end portions and being substantially taut between said end portions and substantially free of sags between said projections and over said recesses between said end portions, said hose connectors having internal threads which correspond to and are adapted to be threadedly received over said projections, and said opposite end portions of said sleeve being sandwiched between said internal threads and said projections, and said sleeve serving to improve the fluid pressure resistance and external wear resistance of said hose while keeping its flexibility substantially intact.

2. A hose construction as set forth in claim 1 in which said sleeve is a fabric sleeve.

3. A hose construction as set forth in claim 2 in which said fabric sleeve is a stockinet.

4. A hose construction as set forth in claim 1 in which said sleeve is a polymeric sleeve.

5. A hose construction as set forth in claim 1 in which projections of said hose extend in a helical path.

6. A hose construction as set forth in claim 1 and further comprising electrical conductor means extending therealong between said hose and said sleeve, said hose connectors have associated electrical connectors supported therein in an embedded manner, and each of said electrical connectors receives an associated end of said electrical conductor means.

7. A hose construction as set forth in claim 6 in which said electrical conductor means comprises a plurality of electrically insulated electrical conductors.

8. A hose construction as set forth in claim 7 in which said electrical conductors are wrapped concentrically around the outside surface of said corrugated hose with said sleeve disposed therearound, said electrical conductors being wound over at least a portion of said hose to thereby assure said electrical conductors do not impair the flexibility of said hose construction.

9. A hose construction as set forth in claim 1 in which said hose is a blow-molded hose.

10. A hose construction as set forth in claim 1 in which said hose is a strip-formed hose.

11. A hose construction as set forth in claim 1 in which said sleeve is made of a fire-resistant fabric material.

12. A hose construction as set forth in claim 11 in which said fire-resistant material is a woven material.

13. A hose construction as set forth in claim 11 in which said sleeve is made of a woven fiberglass material.

* * * * *